July 13, 1954
R. W. JOHNSON ET AL
2,683,565
GAS CONTROL
Filed May 5, 1950
3 Sheets-Sheet 1
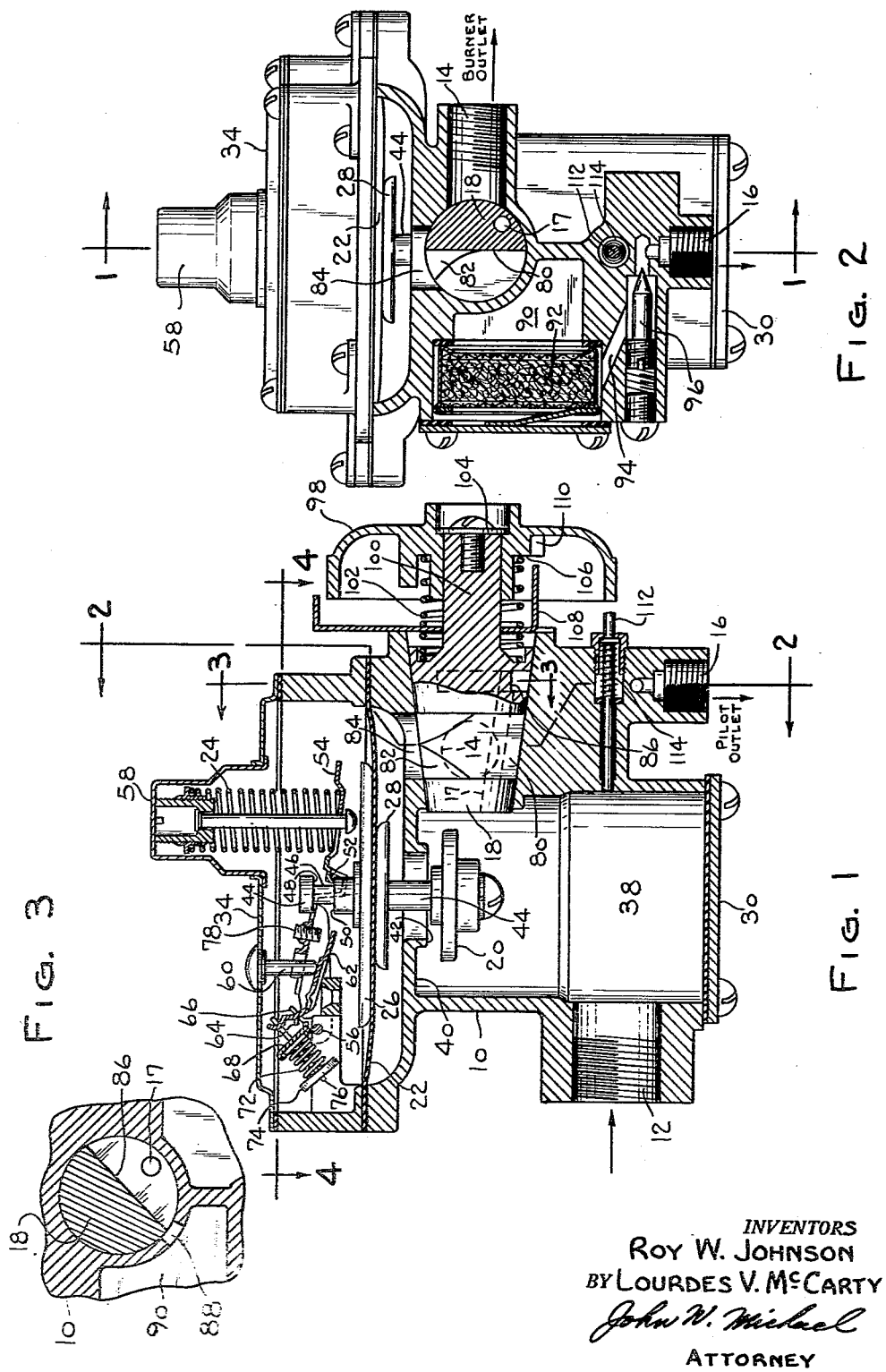
INVENTORS
Roy W. Johnson
BY Lourdes V. McCarty
John W. Michael
ATTORNEY

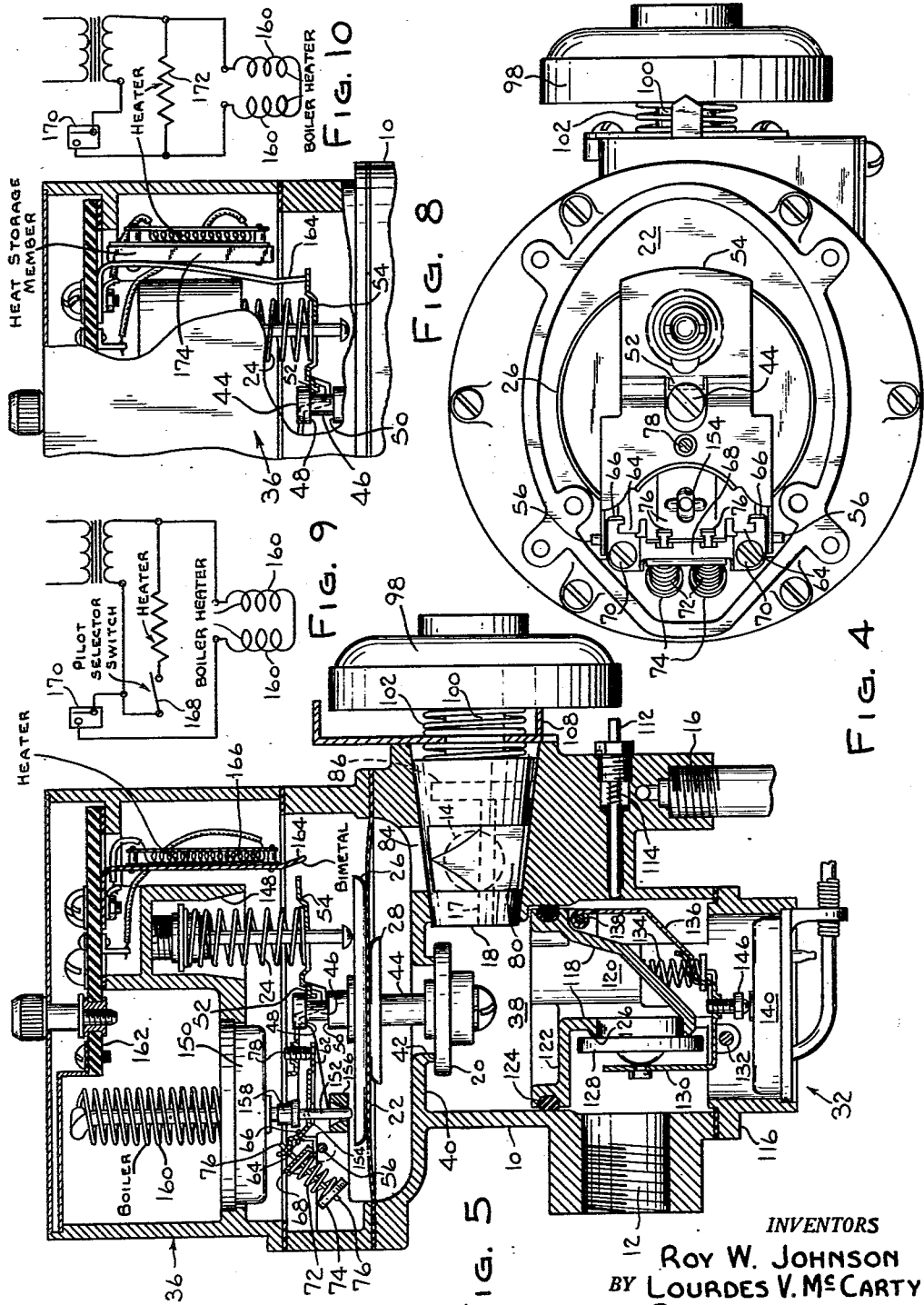

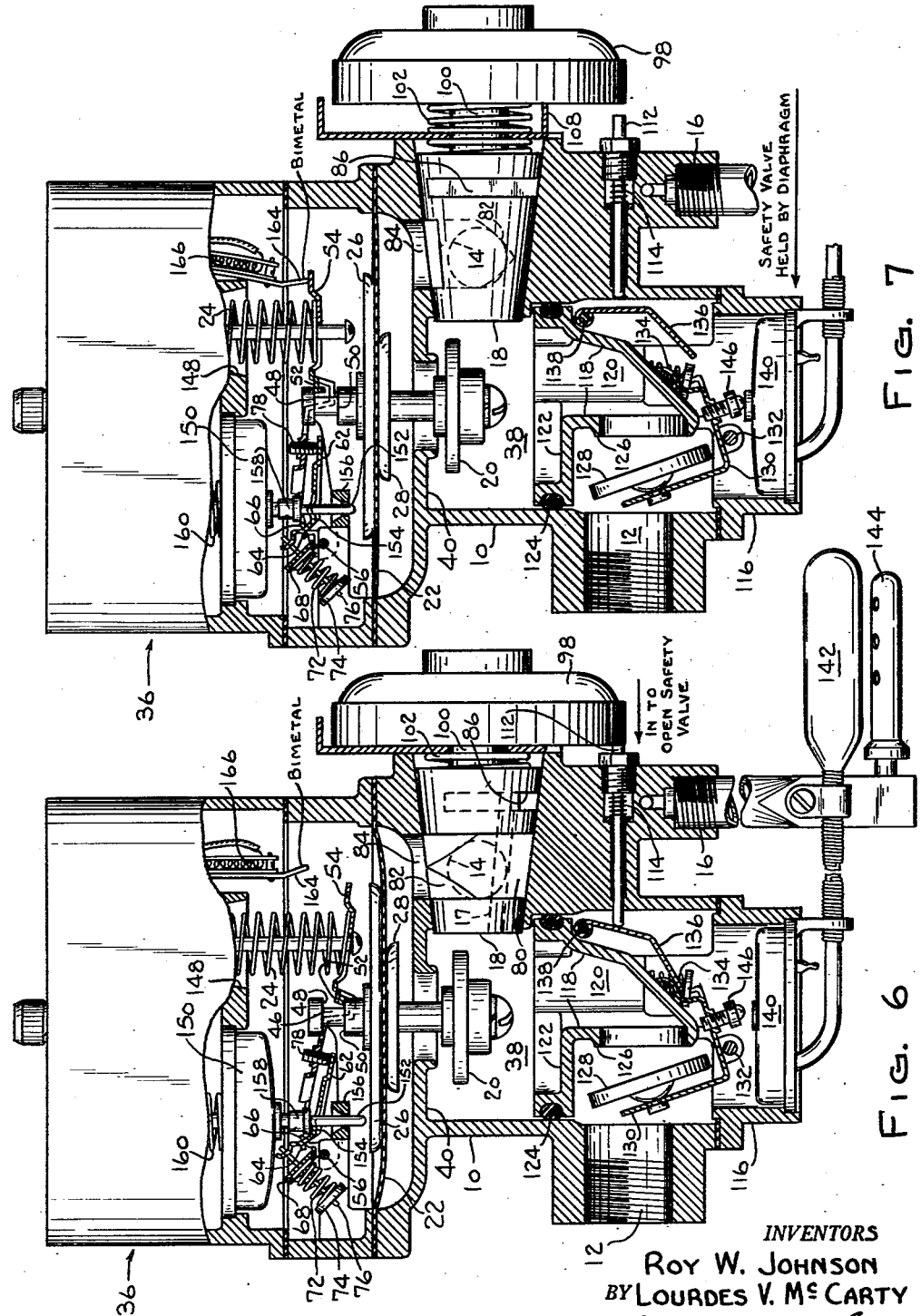

Patented July 13, 1954

2,683,565

UNITED STATES PATENT OFFICE 2,683,565

GAS CONTROL

Roy W. Johnson and Lourdes V. McCarty, Milwaukee County, Wis., assignors to A P Controls Corporation, a corporation of Wisconsin Application May 5, 1950, Serial No. 160,268

18 Claims. (Cl. 236—1)

This invention relates to control of gas flow to burners. More particularly this invention relates to the provision of a simple, compact, manually operated control which may be readily provided with safety controls and may be simply converted into a fully automatic control. This invention, therefore, encompasses the basic or manual control, the basic control provided with the safety features, and the fully automatic control as well as being directed to the novel features of the various sub-combinations. As will appear hereinafter, the fully automatic control provides highly desirable operating characteristics not heretofore attained.

In the past, gas burner controls have been piecemeal affairs wherein each unit, such as a pressure regulator, has been independent and required separate installation. Such installations are costly due to the large number of connections which must be made. The cost of the parts necessarily was high. The controls have been noisy. Another objection is that the controls spread over much of the furnace room. Conversion or modification of prior manual controls to automatic involved discarding many, if not all, elements of the installation, thus adding to the cost of change.

An object of this invention is to produce a simple, compact gas control.

Another object is to produce a gas control which is simple to install and may be manufactured at lower cost.

A further object is to provide a basic or manually operated gas control which permits of modification without discarding operating parts.

Another object is to provide a manually operated gas control and an automatic safety pilot control which may be simply installed in the manual control.

Another object is to provide a fully automatic gas control wherein a single valve serves to regulate flow and pressure.

A further object is to provide a fully automatic gas control which regulates flow for high, intermediate, or pilot fire to provide better heat regulation.

Still another object is to provide a gas control wherein the pressure regulator and the flow control to both the main and the pilot burners are in a single casing.

A still further object is to provide a gas control wherein the pressure regulating diaphragm may be biased in opposition to gas pressure by one or both of two biasing forces.

Still another object is to provide a fully automatic gas control which is extremely quiet in operation.

Other objects and advantages will be pointed out in, or be apparent from, the specification and claims, as will obvious modifications of the embodiments shown in the drawings, in which:

Fig. 1 is a section through the manually operated or basic control;

Fig. 2 is a section on line 2—2 of Fig. 1;

Fig. 3 is a fragmentary section on line 3—3 of Fig. 1;

Fig. 4 is a plan view of the basic control with the cover removed;

Fig. 5 is a section through a fully automatic control comprising the basic control shown in Figs. 1 through 4 provided with an automatic safety pilot valve and automatic valve actuating mechanism responsive to thermostatic control;

Fig. 6 is similar to Fig. 5 but shows the automatic pilot or safety valve in the manually open position and the flow and pressure regulating valve open;

Fig. 7 is similar to Fig. 6 but shows the safety valve held open by action of the diaphragm and shows the pressure and flow regulating valve in a partially open position wherein it passes fuel for an intermediate fire;

Fig. 8 is a fragmentary view showing a preferred automatic control;

Fig. 9 is a wiring diagram for the modification shown in Figs. 5 through 7; and

Fig. 10 is a wiring diagram for the modification shown in Fig. 8.

Broadly the basic or manually operated control comprises a casing 10 provided with an inlet 12, an outlet 14 to the main burner, and an outlet 16 to the pilot burner. Flow from inlet 12 to the pilot outlet 16 passes generally axially through conduit 17 in plug valve 18 which is manually rotatable to control flow to the main outlet. The gas pressure is regulated by valve 20 carried by diaphragm 22. The diaphragm is urged in the valve opening direction by means of spring 24 and by the weight of plates 26, 28 in opposition to the pressure of the gas between the regulating valve 20 and the plug 18.

As may be seen in Figs. 5 through 7, the plate 30 in the inlet portion of the control may be removed to permit the automatic pilot regulator 32 to be mounted in the inlet for interrupting gas flow in the event the pilot light is extinguished. The top 34 of the control may be removed to permit mounting a thermostatically regulated control 36 on the casing. As will appear hereinafter the automatic top 36 is operable to regulate movement of the pressure regulating valve 20 to interrupt the flow to the main burner, pass fuel for a high fire or to pass fuel for an intermediate fire. The electric top 36 may take either the form shown in Figs. 5 through 7 or the form shown in Fig. 8. The basic control may be provided with the automatic pilot 32 without installing the electric top 36, but the automatic pilot is preferably used whenever the electric top is employed.

*Basic or manually operated control*

Gas flowing into inlet 12 of the basic control enters a generally cylindrical chamber 38 having a partition 40 provided with a central opening forming a gas passage and serving as a seat 42 for the regulating valve 20. This valve is carried on stem 44 connected to and passing through the plates 26, 28 on either side of diaphragm 22. The upper portion of stem 44 has an annular groove 46 providing an upper shoulder 48 and a lower shoulder 50. An ear 52 projects into this groove from lever 54 which is apertured to fit over the top of stem 44 and is pivoted on pin 56 carried by the casing. In the manually operated control, lever 54 is at all times free to pivot and ear 52 transmits the force of spring 24, bearing against the lever and seated in cap 58 projecting from cover plate 34, to the valve stem. Plates 26 and 28 on either side of diaphragm 22 are comparatively heavy (for a purpose which will appear hereinafter) and add to force biasing the diaphragm downwardly in opposition to the gas pressure acting on the underside of the diaphragm. It will be apparent that under these conditions movement of regulating valve 20 is so controlled as to regulate the pressure on the underside of diaphragm 22 and thus regulate the pressure at the inlet to the plug valve 18.

As may be seen in Fig. 1, cover 34 is provided with pin 60 projecting downwardly and bearing on lever 62. Lever 62 is provided with ears 64 which cooperate with ears 66 struck from bracket 68 to provide a pivotal axis for the lever 62. Bracket 68 is secured to the casing by means of screws 70, 70 and is provided with a rearwardly and upwardly inclined portion serving as a seat for a pair of compressed springs 72, 72. The other end of each of these springs bears against seat 74 carried on a pin 76 which projects along the spring axis and through the bracket 68 for engagement with lever 62. Thus springs 72, 72 exert a force on lever 62 tending to pivot the lever in a counterclockwise direction so that its right-hand end tends to move upwardly to engage a calibrating screw 78 mounted in lever 54. Depending pin 60 prevents such action and retains the lever 62 in an inoperative position in the basic control. Lever 62 does operate in the fully automatic control, as will be described hereinafter.

The flow of pressure regulated gas to the main burner through outlet 14 is controlled by rotational movement of the plug valve 18. The plug valve is provided with a cut-out portion 80 including a generally V-shaped cut 82 which provides accurate control at low flow rates. As seen in Fig. 2, if plug valve 18 were rotated 90° the gas would flow from the pressure regulating valve through conduit 84, past valve 18 and through outlet 14 to the main burner. It will be appreciated that Fig. 2 illustrates the plug valve in its pilot position wherein no gas can flow to the main burner.

As indicated above, flow to the pilot burner passes generally axially through the conduit 17 in plug valve 18. This conduit terminates in a cut-out portion 86 which is adapted to communicate with opening 88 in the wall surrounding the plug valve. The opening 88 leads to chamber 90 housing filter 92. The gas must flow through the filter before reaching conduit 94 which leads past the metering valve 96 to the pilot outlet 16. As shown in Figs. 1, 2 and 3, the plug valve 18 has been rotated to allow flow to the pilot burner. As viewed in Figs. 2 and 3, the valve is rotated in a clockwise direction to initiate and increase fuel flow to the main burner. As the plug is rotated in the clockwise direction, the pilot will at all times be supplied with fuel due to the shape of cut-out 86 in the plug. A slight rotation in a counterclockwise direction from the position shown in Fig. 3 will interrupt flow to the pilot and the control is in the "off" position. It is to be noted that the pilot flow by-passes the pressure regulating valve. Variations in inlet pressure do not, however, have any appreciable effect on the pilot flame.

Manually operable handwheel 98 is keyed to the plug valve shaft 100 but is axially slidable along the shaft. Spring 102 urges handwheel 98 to its outermost position (Fig. 1) where it seats against shoulder 104. The inside of handwheel 98 is provided with land 106 which cooperates with projection 108 to prevent inward movement of the handwheel unless the handwheel is at the pilot position where cut-out 110 cooperates with the projection 108 to permit the handwheel to be moved inwardly. Inward movement causes the periphery of handwheel 98 to strike the end of pin 112 and move the pin into chamber 38 on the inlet side of the control. Cut-out 110 and projection 108 cooperate to prevent rotation of handwheel 98 while depressed. It may be noted that pin 112 is biased outwardly by spring 114 and passes through suitable gaskets to prevent gas leakage.

*Operation of the basic or manually operated control*

The handwheel 98 is rotated to the "off" position in order to interrupt fuel flow to the main and pilot burners. In order to start up the heater the valve is first rotated to the pilot position shown in Figs. 1 through 3 wherein fuel passes through the conduit 17 in the plug valve into the cut-out portion 86 for flow past filter 92 and needle valve 96 and out through outlet 16 to the pilot burner. After the pilot has been ignited, the handwheel may be rotated further to permit fuel flow to the main burner through outlet 14. Under all operating conditions between pilot and maximum fuel flow the pilot burner receives fuel.

*Conversion to automatic pilot*

The basic control is readily provided with an automatic safety feature operable to cut off all fuel flow in the event that the pilot goes out. For this purpose the bottom plate 30 is removed from casing 10 to expose the inlet chamber 38. The automatic pilot control may now be inserted and mounted in the inlet chamber 38. This control comprises a base 116 which is adapted to be secured to the casing and is provided with a vertical portion 118 providing a conduit 120 and having a horizontal portion 122 carrying a neoprene O-ring seal 124. The front wall of portion 118 is apertured and provides seat 126 for the safety valve 128. The safety valve is carried on arm 130 pivoted on pin 132 and urged to its seated position by compressed spring 134. Lever 136, pivotally mounted on pin 138, is adapted to bear against the right-hand end of valve lever 130 when actuated by pin 112.

Inserting the automatic pilot control into the inlet chamber 38 of casing 10 requires the safety valve 128 to be open in order for gas to flow to the regulating valve and the pilot burner. This valve must, of course, be manually opened in order to initiate fuel flow to the pilot burner. This is accomplished by rotating the handwheel 93 to the pilot position where cut-out 110 in land 106 permits the handwheel to be moved inwardly so as to strike pin 122 and move it inwardly as shown in Fig. 6. The inward movement of pin 112 moves lever 136 about its pivot 138 to pivot lever 130 about pin 132 and open the valve, thus allowing flow to the pilot burner through the axial conduit 17 in the plug valve 18. The handwheel cannot be rotated while depressed.

The lower portion of the automatic pilot control is provided with a snap diaphragm 140 which is connected to bulb 142 mounted adjacent the pilot burner 144. When the pilot has been ignited and bulb 142 has been heated sufficiently, diaphragm 140 snaps outwardly to bear against the calibrating pin 146 in lever 130 and hold safety valve 128 open. After the diaphragm has snapped to hold the valve open, the handwheel may be released (whereupon it moves outwardly under influence of spring 102) so pin 112 may move back to its normal position. If the pilot light goes out, bulb 142 will cool and diaphragm 140 snaps inwardly, permitting spring 134 to move lever 130 and close the valve 128.

*Operation with automatic pilot*

To place the control in operation the handwheel is rotated from the "off" position to the "pilot" position where the cut-out 110 in land 106 permits the handwheel to be depressed to actuate pin 112 and cock the safety valve 128 open. Gas now flows through conduit 17 in the plug valve, through the filter and then to the pilot burner where it is ignited. When the pilot flame has heated bulb 142 sufficiently, the diaphragm snaps out to hold the safety valve open. Obviously, the handwheel must be depressed until the diaphragm snaps out to hold the valve open. Upon release and return of the handwheel to normal position the handwheel may be rotated to start gas flow to the main burner. Rotation of the plug valve to increase flow to the main burner before the pilot is properly ignited is prevented by engagement of projection 108 with cut-out 110 in land 106 when the handwheel is depressed.

*Conversion of the basic unit to automatic control of Figs. 5, 7 and 9*

When the basic unit is made full automatic, the conversion should include the installation of the automatic pilot as set forth above. To install the fully automatic control the top 34 of the basic unit is removed and the automatic or electric top 36 is secured to the casing in its place. The electric top 36 is provided with a well 149 receiving the upper end of spring 24. It is to be noted that the removal of the cover from the basic unit removes the depending pin 60 and permits springs 72, 72 to swing lever 62 upwardly until it contacts calibrating screw 78 in lever 54 and raises the lever against the force of spring 24. As lever 54 swings up, projecting ear 52 engages upper shoulder 48 on valve stem 44 to lift and close the valve. The top is provided with a snap diaphragm 150 having actuating pin 152 projecting downwardly through aperture 154 in lever 62 into guideway 156 carried by the casing. The pin 152 is provided with shoulder 158 which is adapted to engage the edges of aperture 154 when the pin moves downwardly. When the diaphragm snaps downwardly, pin 152 moves lever 62 to its inoperative position and valve operating lever 54 resumes its function of transmitting force from spring 24 to the valve stem 44 through ear 52 and lower shoulder 50 on the valve stem. This permits the regulating valve 20 to open as shown in Fig. 6. When the diaphragm snaps upwardly and withdraws the actuating pin 152, the parts will return to the original position shown in Fig. 5 wherein the regulating valve 20 is held closed and flow is limited to pilot flow through conduit 17 in plug valve 18.

Pressure to flex diaphragm 150 is obtained by impressing an electric current across a pair of capillary tube type boilers 160 which contain vaporizable fluids. These boilers heat rapidly and insure snap action on the diaphragm, so necessary in proper handling of gaseous fuels. The boilers are, of course, wired to the terminal board 162 for connection in circuit with a suitable room thermostat. For reasons which will appear hereinafter, this thermostat is preferably of the heat anticipator type.

As considered to this point it will be appreciated that closure of the room thermostat will vaporize the contents of the boilers 160, snap diaphragm 150 outwardly and move the parts from the position shown in Fig. 5 to that shown in Fig. 6 wherein spring 24 and the weight of plates 26, 28 act on diaphragm 22 in opposition to the gas pressure on the underside of the diaphragm. Under these conditions the pressure regulating valve 20 will maintain the desired pressure on the underside of the diaphragm 22.

In the modification illustrated in Figs. 5 through 7, bimetal 164 is secured to the underside of terminal board 162 and projects downwardly toward the free end of valve operating lever 54. Heater 166 is connected to bimetal 164. When heater 166 is energized, the bimetal warps inwardly from the position shown in Figs. 5 and 6 to the position shown in Fig. 7. Since the lower end of bimetal 164 is below the uppermost position of valve operating lever 54 (when the lever is in the position shown in Fig. 5), it will be apparent that bimetal 164, when heated, will prevent the valve operating lever from rising to the valve closed position. This position may be seen in Fig. 7 where it is to be noted that the diaphragm has moved actuating pin 152 upwardly so springs 72, 72 have raised lever 62 and valve operating lever 54 upwardly until the tip of the operating lever engages the lower end of warped bimetal 164. Since the force exerted by springs 72 is greater than the force exerted by spring 24, it will be appreciated that spring 24 no longer influences the movement of the regulating valve. Therefore, the gas pressure on the underside of the diaphragm 22 is opposed only by the weight of plates 26, 28 and the valve is free to move between limits determined by engagement of ear 52 with valve stem shoulders 48, 50. Under these conditions the gas pressure on the underside of diaphragm 22 is maintained at a reduced value.

The heater 166 on bimetal 164 is adapted to be selectively energized by means of manually operated switch 168 preferably mounted on the side of room thermostat 170. When switch 168 is closed, heater 166 is continuously energized so that the bimetal serves as a stop preventing complete closure of the regulating valve 20. Since, as will be more fully explained hereinafter, the plug valve 18 is left in the full open position when operating the control automatically, the main burner will receive an intermediate or high pilot fuel flow during such time as the control is in the position illustrated in Fig. 7. This position is assumed, of course, when the thermostat is satisfied. When the thermostat calls for heat, the valve moves to the position shown in Fig. 6 wherein the pressure on the underside of diaphragm 22 is increased and the fire goes to high. The bimetal, of course, remains warped. It will be apparent, therefore, that the automatic control regulates the fire between high and intermediate or high pilot when heater 166 is energized. When switch 168 is opened, heater 166 is deenergized and the bimetal swings to the right as it cools until the end of operating lever 54 is free to be moved upwardly under influence of springs 72, 72 acting on lever 62. The control now regulates the fire between high and pilot.

In balmy spring and fall weather the pilot selector switch 168 is opened so that the furnace supplies heat (above pilot) only upon thermostat closure. However, on colder days when the heat demand is greater, pilot selector switch 168 may be closed to prevent the control from going to the low pilot condition. Under these conditions the fire fluctuates between intermediate or high pilot and high. Therefore, there is heat flow into the room at all times and the condition known as "cold 70" is avoided. The use of a heat anticipator thermostat is desirable to hold the temperature as even as possible.

*Operation of automatic control of Figs. 5 through 7 and 9*

To place the control in operation from a cold start, the handwheel 98 is rotated from the "off" position to the "pilot" position. The handwheel is now depressed to move pin 112 inwardly against lever 136 to pivot lever 130 and open valve 128. The gas flow through plug valve 18 and the filter 92 to the pilot burner is then ignited. The handwheel is retained in the depressed position until bulb 142 is heated sufficiently to snap the diaphragm outwardly and hold valve 128 open. The plug valve cannot be rotated so long as the handwheel is depressed, thus preventing a dangerous increase of fuel flow before the ignition is complete. Should the pilot light go out, the diaphragm snaps inwardly and spring 134 will return valve 128 to the closed position. The pilot normally burns at all times.

Having ignited the pilot burner, the plug valve is rotated to the open position. Assuming there is no call for heat, actuating pin 152 carried by diaphragm 150 is in its uppermost position and springs 72, 72 hold regulating valve 20 closed in opposition to spring 24 and the weight of plates 26, 28. When the room thermostat 170 calls for heat, the diaphragm snaps downwardly to pivot lever 62 and permit the spring and the diaphragm plates to act on the diaphragm in opposition to the gas pressure and thereby regulate the pressure at the predetermined desired value. The flow through outlet 14 to the main burner provides a high heat output. Upon satisfaction of the thermostatic demand, the circuit across boilers 160 is broken and the vaporizable contents of the capillary tubes condense to snap the diaphragm upwardly and permit springs 72, 72 to raise levers 62 and 54 upwardly and close valve 20. The control is now back at "pilot."

Should it be desired to operate the valve between high and intermediate or high pilot to obtain continuous heat flow, the pilot selector switch 168 is closed to energize heater 166. This warps bimetal 164 inwardly to serve as a stop preventing complete upward movement of operating lever 54 when the thermostat is satisfied. Under these conditions the pressure on the underside of diaphragm 22 is regulated at a reduced value since it is opposed only by the weight of plates 26, 28. The flow to the burner is reduced accordingly and the heat output is intermediate. When the thermostat calls for heat the diaphragm snaps outwardly to push lever 62 to the inoperative position and return lever 54 to its operative position so that spring 24 now acts on the diaphragm along with the weight of plates 26, 28. The pressure is now regulated at a higher value and the burner receives fuel for high fire.

*Automatic control in the modification of Figs. 8 and 10*

The basic unit may be converted to fully automatic control providing different and more desirable operating characteristics by attaching a modified electric top 36 (Fig. 8) in lieu of the top utilized in the modification shown in Figs. 5 through 7. The difference lies in the fact that the bimetal heater 172 is mounted on a brass bar or heat storage member 174 which is secured to the upper end of the bimetal 164. The heater 172 is wired in parallel with the capillary boilers 160. Thus every time the thermostat calls for heat the heater is energized simultaneously with the boilers. Upon each thermostat closure the heater will heat the brass strip and the bimetal to the point where the bimetal warps to its operative position where it serves as a stop preventing return of lever 54 to the "off" position. Upon satisfaction of the heat demand the heat stored in the brass strip keeps the bimetal in its operative position for a period of time which is, of course, dependent upon the amount of heat stored in the bar which is, in turn, dependent upon the period the thermostat remains closed and the capacity of the heater. In practice the period can effectively range between 4 and 10 minutes.

*Operation of automatic control in Figs. 8 and 10*

The control is placed into operation in the same manner as the control in Figs. 5 through 7. The operating characteristics are considerably different, however. When the thermostat calls for heat from a cold start, the diaphragm snaps downwardly and the pressure is regulated at its high value. For the duration of the thermostatic closure, heater 172 is energized and warps bimetal 164 into its operative position. Therefore, upon satisfaction of the thermostatic demand the fire will be regulated at intermediate until the bimetal 164 and the heat storage member 174 have cooled sufficiently to permit the bimetal to warp to the inoperative position or until there is a new thermostatic demand for heat. In the event that the former condition obtains, the main burner would be cut off and the control would be at "pilot." If the latter condition obtains, however, the fire will return to high. If the thermostat does not recycle within the period determined by the amount of heat stored in the brass bar 174, the main burner will be turned off. On days when the demand is frequent, such as on winter days, the fire will vary between high and intermediate. A heat anticipator thermostat with its frequent operation is very desirable with this modification to obtain the desired characteristics.

It will be appreciated by those skilled in the art that this modification provides a control which may be said to be responsive to the heat demand of the day rather than merely being responsive to thermostatic demand for heat. When the heat demand of the day is high the device provides a continuous flow of heat and eliminates the so-called cold 70. On the balmy days when the heat demand is low and the intermediate output would be too great the fire is returned to pilot after the thermostat is satisfied. The net result of the heating characteristics is to provide all the good features of coal heat without the bad features.

Comments

The basic control is simple and compact while being adapted for rapid conversion to a control having safety features or to either of two fully automatic, thermostatically regulated, controls which have different operating characteristics. While the basic control is equipped with some parts which have no use until conversion is made the manufacturing cost savings incident to volume production made possible by employing the same body for any of the four modifications make possible lower consumer cost than heretofore found in the field for comparable equipment. These savings are also felt in the converted units.

The basic unit may be employed on space heaters in many localities. An ever increasing number of cities, however, require safety pilot devices. The ease with which the basic control may be provided with the automatic pilot makes the conversion practical as well as simplifying the distributor's problems and keeping his inventories reduced.

The automatic control of Figs. 5 through 7 permits the occupant to select the pilot condition. Thus, in warm weather when there is infrequent thermostatic demand, the pilot may be set for "low" and the heater is regulated between high and low pilot. In colder weather, however, it is desirable to have a continuous heat flow into the room and the selector is set at "high" to cause the heater to go between high and high pilot. This provides very desirable heating characteristics but is subject to objection in that failure to set the selector at low on a warm day will cause the control to supply too much heat.

The control of Figs. 8 and 10 provides operating characteristics which have never before been attained. After satisfaction of each thermostatic demand, the fire is reduced from high to intermediate where it remains for a period of time dependent upon the duration of the demand just satisfied. If the thermostat recycles during this period the fire returns to high. However, failure of the thermostat to close within the period reduces the fire to pilot. This operation is highly desirable since the control adapts to the heat demand of the day to provide the most desirable heating. In cold weather when the thermostat calls for heat frequently, the fire never goes to pilot. In warm weather when the thermostatic demand is infrequent or is limited to early morning and late in the day, the fire goes to pilot to prevent overheating the space. It will be appreciated that this operation is quite different from a system which is responsive only to thermostatic demand. The modification of Figs. 8 and 10 adapts itself to the heat demand of the day by providing variable but continuous heat when desirable while substantially providing "on-off" heat when dictated by weather conditions. This control, therefore, provides even, comfortable heat under all conditions. The characteristics are substantially the same as found in coal heat. These characteristics have long been sought in gas heat but never before attained. It is to be noted that both of the automatic controls are extremely compact. These controls are extremely quiet in operation since the action is derived from bimetals, diaphragms and springs.

While the provision of a gas control responsive to the heat demand of the day is part of this invention, the broad aspects of such a thermostatic system are claimed in the application of Roy W. Johnson, Serial No. 143,251, filed February 9, 1950, now Patent No. 2,643,061, granted June 23, 1953. The broad teachings of Johnson in said application are applicable to fuel systems other than gas. Thus said application discloses regulation of oil flow to a burner. The co-pending application of Roy W. Johnson et al., Serial No. 237,332, filed July 18, 1951, shows the teachings incorporated in an oil control provided with electric ignition.

It will be appreciated that the illustrated and described devices permit of modification without departing from the invention. Therefore, this invention is to be limited only by the scope of the claims.

We claim:

1. A gas control comprising, a casing having an inlet and an outlet, a pressure regulating valve between said inlet and said outlet, a diaphragm operatively connected to said valve, means biasing said diaphragm in the valve opening direction, the pressure between said valve and said outlet acting on said diaphragm in opposition to said biasing means, a manually operable valve controlling flow between said pressure regulating valve and said outlet, a pilot outlet in said casing, and conduit means connecting said pilot outlet to the inlet side of said pressure regulating valve, said manual valve being operable to control flow to said pilot outlet through said conduit means.

2. In a gas control, a casing having an inlet and an outlet to a main burner, a manually operable valve controlling flow through said outlet, a pressure regulating valve in said casing for regulating the pressure at said manually operable valve, a safety valve regulating flow of said pressure regulating valve, conduit means including said manual valve for controlling gas flow from the space between said safety valve and said pressure regulating valve to a pilot burner, and means responsive to the heat of the pilot burner to hold said safety valve open.

3. The gas control according to claim 2 provided with means for manually opening said safety valve, said last means being operable only when said manually operable valve prevents flow to the main burner.

4. A gas control having an inlet and an outlet, a valve between said inlet and said outlet, a diaphragm connected to said valve, the pressure between said valve and said outlet acting on said diaphragm in a direction tending to close the valve, first means biasing said diaphragm in opposition to said pressure, second means biasing said diaphragm in opposition to said pressure, said first and second biasing means acting jointly to regulate the diaphragm to maintain a predetermined pressure between the valve and said outlet, means for rendering one of said biasing means inoperative while the other biasing means continues to act on said diaphragm to maintain a reduced pressure between the valve and the outlet, and means for closing said valve.

5. A gas control having an inlet and an outlet, a valve between said inlet and said outlet, a diaphragm connected to said valve, the pressure between said valve and said outlet acting on said diaphragm in a direction tending to close the valve, a weight acting on said diaphragm in opposition to said pressure, a spring acting on said diaphragm in opposition to said pressure, said weight and said spring acting on the diaphragm to maintain a predetermined pressure between the outlet and the valve, and means for rendering said spring inoperative so that the pressure is opposed only by said weight and the pressure is maintained at a reduced pressure.

6. In a gas control, a casing having an inlet and an outlet, a valve for regulating flow between said inlet and said outlet, a diaphragm, said valve being mounted on said diaphragm, the gas pressure between said valve and said outlet acting on said diaphragm, a thermostat, means responsive to thermostatic demand for heat to exert a predetermined force on said diaphragm in opposition to said pressure to maintain said pressure at a given value, means operable upon satisfaction of the demand for reducing the force operatively acting on said diaphragm in opposition to said gas pressure to reduce the pressure maintained between the valve and the outlet to a value intermediate said given value and atmospheric pressure, and means for overcoming the force acting on the diaphragm to close the valve.

7. In a gas control, a casing having an inlet and an outlet, a valve for regulating flow through the casing, said valve being carried by a diaphragm having one side subjected to the gas pressure between said valve and said outlet, operator means having low, intermediate and high positions and adapted to act on the other side of said diaphragm, means responsive to thermostatic demand for heat to exert a predetermined force on said other side of said diaphragm so said gas pressure is maintained at a given value, means operable in absence of thermostatic demand for heat to exert a force tending to close said valve, means adapted for latching said operator in said intermediate position, and means for reducing the force exerted on said diaphragm when said operator means is in said intermediate position.

8. The control according to claim 7 wherein said latching means comprises a bimetal adapted to engage and latch said operator means in said intermediate position when heated, and a heater for said bimetal.

9. The control according to claim 8 including heat storage means for retarding the cooling of the bimetal upon de-energization of said heater, said heater being continuously energized for the duration of the thermostatic demand for heat.

10. A gas control comprising, a casing having an inlet and an outlet, said outlet being adapted to be connected to a burner, a diaphragm in said casing, a valve carried by said diaphragm and adapted to control flow through the casing, the gas pressure between said valve and said outlet acting on said diaphragm, first biasing means acting on said diaphragm in opposition to said pressure, an operating lever pivotally mounted in said casing and having a lost motion connection to said diaphragm, second biasing means acting on said lever to urge the diaphragm in opposition to said pressure, a control lever adapted to engage said operating lever, third biasing means acting on said control lever to move said operating lever to an inactive position in opposition to said first and second biasing means, said valve being closed when said operating lever is in said inactive position, means responsive to thermostatic demand for heat for rendering said control lever inoperative so that said pressure is opposed by said first and second biasing means at a high value, means operable to stop movement of said operating lever under influence of said control lever at an intermediate point upon satisfaction of the thermostatic heat demand, said first biasing means being operable when said operating lever is in its intermediate position whereby said pressure is regulated at a reduced value.

11. The control according to claim 10 in which said stop means comprises, a bimetal inoperable when cool and operable to engage and stop said operating lever when heated, and a heater for said bimetal.

12. The control according to claim 10 in which said stop means comprises, a bimetal inoperable when cool and operable to engage and stop said operating lever when heated, a heater for said bimetal, said heater being energized in response to thermostatic demand for heat, and a heat storage member associated with said heater and said bimetal whereby said bimetal cools slowly upon satisfaction of the demand.

13. A control according to claim 10 having a manually operable valve between the regulating valve and said outlet, said manual valve being operable to control flow to the outlet.

14. In the control according to claim 13, a second outlet from said casing and adapted for connection to a pilot burner, said manual valve being operable to regulate flow from the upstream side of said regulating valve to said second outlet.

15. In the control set forth in claim 14 a safety valve in said casing for regulating flow to said regulating valve and said manual valve, means biasing said safety valve to its closed position, and means responsive to heat at the pilot burner for holding said safety valve open.

16. In the control set forth in claim 15 handle means for operating said manual valve, means operable by said handle means for opening said safety valve, said valve opening means being operable only when said manual valve prevents flow to the first named outlet and permits flow to said second outlet.

17. A device for use with a gas control including a pressure regulating valve operated by a lever which is movable to a position closing said valve by means of a second lever, comprising, a casing adapted for connection to said control, a diaphragm, a boiler containing vaporizable fluid and connected to said diaphragm for flexing the diaphragm, actuating means mounted on said diaphragm and adapted to actuate said second lever, a bimetal mounted in said casing and adapted for engagement with the first said lever when heated, such engagement being adapted to prevent closure of said valve, and a heater for said bimetal.

18. The device according to claim 17 and having a heat storage member associated with said heater and said bimetal to retard cooling of the bimetal upon de-energization of said heater, said heater and said boiler being adapted for simultaneous energization.

References Cited in the file of this patent

UNITED STATES PATENTS

| Number | Name | Date |
|---|---|---|
| 1,762,133 | Harris | June 3, 1930 |
| 1,814,812 | Klees | July 14, 1931 |
| 1,814,834 | Klees | July 14, 1931 |
| 1,814,935 | Klees | July 14, 1931 |
| 1,888,449 | Burns | Nov. 22, 1932 |
| 2,187,834 | Mantz | Jan. 23, 1940 |
| 2,245,834 | Sparrow | June 17, 1941 |
| 2,314,266 | Beam | Mar. 16, 1943 |
| 2,319,685 | Jackson | May 18, 1943 |
| 2,451,459 | Williams | Oct. 19, 1948 |
| 2,507,113 | Marshall | May 9, 1950 |

FOREIGN PATENTS

| Number | Country | Date |
|---|---|---|
| 496,305 | Great Britain | Nov. 29, 1938 |